US008294881B2

(12) United States Patent
Hellickson et al.

(10) Patent No.: US 8,294,881 B2
(45) Date of Patent: Oct. 23, 2012

(54) SECURITY SYSTEM USING LADAR-BASED SENSORS

(75) Inventors: Dean R. Hellickson, Palm Harbor, FL (US); Kurt Holmquist, Lutz, FL (US); James Cook, St. Petersburg, FL (US); Andrew W. Guyette, Clearwater, FL (US); Robert Burns, St. Petersburg, FL (US)

(73) Assignee: Honeywell International Inc., Morristown, NJ (US)

( * ) Notice: Subject to any disclaimer, the term of this patent is extended or adjusted under 35 U.S.C. 154(b) by 1093 days.

(21) Appl. No.: 12/198,678

(22) Filed: Aug. 26, 2008

(65) Prior Publication Data
US 2010/0053330 A1 Mar. 4, 2010

(51) Int. Cl.
G01C 3/08 (2006.01)

(52) U.S. Cl. ............ 356/5.01; 356/3.01; 356/4.01; 356/5.1

(58) Field of Classification Search ......... 356/3.01–28.5
See application file for complete search history.

(56) References Cited

U.S. PATENT DOCUMENTS

| | | | |
|---|---|---|---|
| 5,521,634 A | 5/1996 | McGary | |
| 5,644,386 A * | 7/1997 | Jenkins et al. | 356/4.01 |
| 5,867,257 A | 2/1999 | Rice et al. | |
| 6,816,073 B2 | 11/2004 | Vaccaro et al. | |
| 2005/0278098 A1 * | 12/2005 | Breed | 701/45 |
| 2007/0005609 A1 * | 1/2007 | Breed | 707/10 |
| 2007/0171042 A1 | 7/2007 | Metes et al. | |
| 2008/0094212 A1 | 4/2008 | Breed | |

FOREIGN PATENT DOCUMENTS

| | | |
|---|---|---|
| WO | 2005004052 | 1/2005 |
| WO | 2007007323 | 1/2007 |

OTHER PUBLICATIONS

Siepmann, James P., "Fusion of Current Technologies with Real-Time 3D MEMS Ladar for Novel Security and Defense Applications", "Proceedings of SPIE", 2006, vol. 6214, Publisher: Society of Photo-Optical Instrumentation Engineers.

* cited by examiner

Primary Examiner — Luke Ratcliffe
(74) Attorney, Agent, or Firm — Fogg & Powers LLC

(57) ABSTRACT

A security sensor system comprises one or more laser detection and ranging (LADAR) sensors configured for accumulation of three-dimensional image data. In one embodiment, the one or more LADAR sensors each comprise a LADAR device, such as a MEMS device, configured to transmit a plurality of laser pulses, and a microprocessor operatively coupled to the LADAR device. One or more data storage devices is operatively coupled to the microprocessor and configured to store the three-dimensional image data, as well as predetermined protected area boundary and fixed object definitions. A GPS receiver can be operatively coupled to the microprocessor and a GPS antenna. The microprocessor is configured to perform a LADAR image analysis that compares the three-dimensional image data with the protected area boundary and fixed object definitions to identify one or more potential intruders.

12 Claims, 12 Drawing Sheets

SECURITY SYSTEM USING LADAR-BASED SENSORS

BACKGROUND

Current security sensors, which are used to secure a perimeter or volumetric area of a site, include volumetric, linear, video analytic, or curtain style security sensors. These security sensors are prone to high false alarm and nuisance alarm rates due to a variety of environmental and natural triggers. Examples of such triggers include movements of small or large animals, wind blown debris, moving vegetation, temperature gradients, moving clouds, rain, snow, and moving water.

In addition, conventional security sensors are not able to provide geo-locations of targets to aid in moving cameras or displaying target positions on geo-referenced maps or displays, or provide position and direction of travel data. While such security sensors are able to reduce sensitivities to smaller targets or environmental conditions, this is at the expense of reducing the ability to detect actual intrusions. Due to limitations in range or field of view, multiple sensors must be used to cover large sites, with expensive material, installation, reliability, and maintenance costs.

An additional problem of conventional security sensors is the inability to accurately discriminate between areas that are required to be secure and adjacent areas that are not secure. Such discrimination would be useful in cases where a temporary secure area is needed and it is impractical to set up effective physical barriers such as fencing, walls, etc. Instead, the secured area might be marked only by crime scene tape or temporary barricades, for example. In these cases there may be a lot of human or vehicle traffic (e.g., gawkers) outside the secure area.

Accordingly, there is a need for improved security sensors that overcome the above deficiencies.

SUMMARY

The present invention is related to a security sensor system comprising one or more laser detection and ranging (LADAR) sensors configured for accumulation of three-dimensional image data. In one embodiment, the one or more LADAR sensors each comprise a LADAR device, such as a micro-electro-mechanical systems (MEMS) device, configured to transmit a plurality of laser pulses, and a microprocessor operatively coupled to the LADAR device. One or more data storage devices is operatively coupled to the microprocessor and configured to store the three-dimensional image data, as well as predetermined protected area boundary and fixed object definitions. A Global Positioning System (GPS) receiver can be operatively coupled to the microprocessor and a GPS antenna. The microprocessor is configured to perform a LADAR image analysis that compares the three-dimensional image data with the protected area boundary and fixed object definitions to identify one or more potential intruders.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

Figure 1:
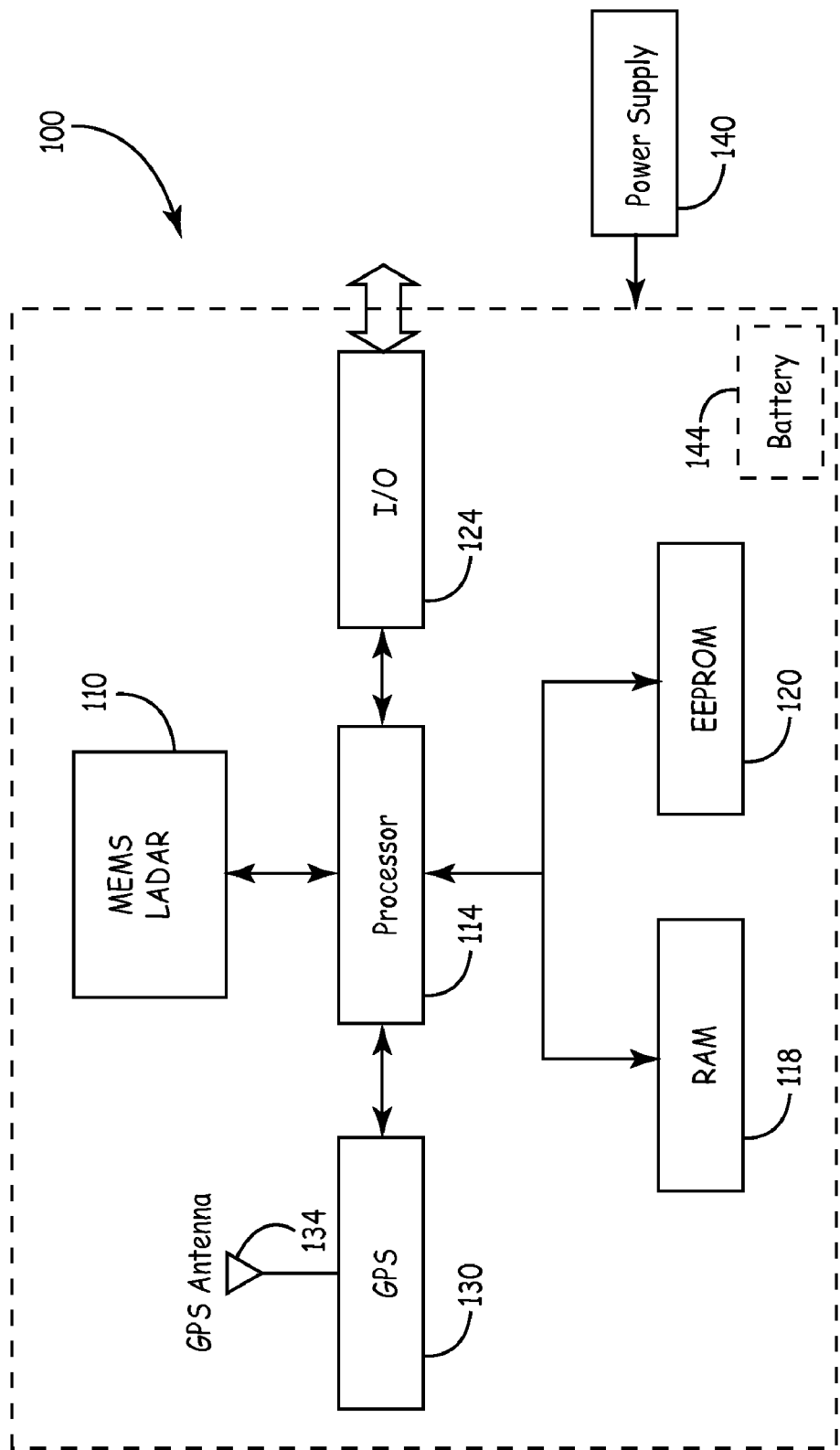
FIG. 1 is a block diagram of a LADAR security sensor according to one embodiment of the invention.

In the following detailed description, embodiments are described in sufficient detail to enable those skilled in the art to practice the invention. It is to be understood that other embodiments may be utilized without departing from the scope of the present invention. The following description is, therefore, not to be taken in a limiting sense.

The present invention is directed to a Laser Detection and Ranging (LADAR) sensor for use in a security system. The LADAR sensor generally includes a LADAR device and a data processor. The LADAR device provides optical remote sensing that measures properties of scattered light from the LADAR device to find range and/or other information of a distant target. The data processor creates and stores a three-dimensional (3-D) volumetric map based on scan images from the LADAR device. One or more LADAR sensors can be implemented in a stand-alone security system with no other types of sensors, or can be incorporated with other conventional security sensors using a sensor fusion approach. LADAR is also referred to as LIDAR (Light Detection and Ranging), typically in non-military contexts.

In one embodiment, the LADAR sensor can be implemented with a Micro Electro-Mechanical Systems (MEMS) LADAR device and an embedded microprocessor. In another embodiment, the LADAR device can be interfaced with a remote processor at an external location with sufficient memory and processing throughput to collect and analyze LADAR data. The LADAR sensor can employ standard interfaces to communicate with a variety of external equipment such as Global Positioning System (GPS) devices, computers, alarm systems, and the like. The data from the LADAR sensor provides size, position, and direction of movement that can be used for classification of intruder type over a standard interface.

In another embodiment, the LADAR sensor can include a Global Positioning System (GPS) receiver that provides location data. Together, the GPS receiver and processor provide detection, classification, range, and position information, in day or night conditions, of intruders or changes in scenery within a secured area. The present LADAR sensor can learn environmental features of a secured area, and detect intrusions with geo-located data being generated through the GPS receiver for autonomous use, or previously input location information for manual sensor installation without GPS.

Data outputs from the LADAR sensors to a security system include an overall alarm indication, target identification data, position data, and velocity data that can be used to display the threat on a geo-located map or display at a command and control facility. The data can also be used to slew pan, tilt and zoom cameras for visual assessment by a human operator, or position any other device that would need to track a moving target such as a lethal or non-lethal weapon, light source, microwave, or water cannon, for example. The data can also be used to provide analog outputs to open or close access points on a road or a door based on the target identification. The range measurement capability of the LADAR sensors allows for different alarm levels based on the exact location and direction of travel of a target.

The LADAR data eliminates typical false and nuisance alarm causes while providing robust security information about the target and its location. Due to the dynamic range of the LADAR devices, fewer sensors are needed in a security system, reducing overall costs and improving system reliability while providing a robust security system.

Further details of various aspects of the present invention are described hereafter with respect to the drawings.

FIG. 1 is a block diagram of a security sensor 100 according to one embodiment that can be employed as a stand-alone sensor for surveillance of a secured area. The security sensor 100 includes a LADAR device 110 such as a MEMS LADAR device or other type of LADAR device. The LADAR device 110 is in operative communication with a processor 114, which can be an embedded microprocessor, for example. Alternatively, processor 114 can be implemented as a remote processor at an external location. The processor 114 is operatively coupled to one or more data storage devices, such as a RAM 118 and/or an EEPROM 120. The processor 114 is also operatively coupled to one or more input/output (I/O) interfaces 124, such as Ethernet, RS-422 interfaces, 1394 interfaces, discrete-to-digital interfaces, and the like.

In one embodiment, a GPS receiver 130 can be implemented with security sensor 100. The GPS receiver 130 can be operatively coupled to processor 114 and includes a GPS antenna 134. An external power supply 140 can be connected to sensor 100 to provide the necessary power to operate security sensor 100. An optional battery 144 can be incorporated into security sensor 100 for use in remote operations where an external power supply is not available.

The various components of security sensor 100 can be integrated together in a single package, or can be implemented as discrete components.

During operation, sensor 100 scans a user defined area within the sensor's field of view and learns the three-dimensional (3-D) environment. An embedded GPS receiver, or manually input position location data, is used to locate a position of sensor 100 as well as reference site and target position information. Site information is input into processor 114 that describes the 3-D field of view that is being secured. When a target comes into the field of view of sensor 100, it paints a 3-D point cloud of the target that is then analyzed for size, position, movement, and "friend or foe" status.

Target recognition algorithms operating on processor 114 produce object classifications to provide the end user with probable target identification data. Using position and calculated velocity data of the target within a sensor data fusion algorithm allows for classifying the intruding target as a threat or benign target.

In one approach, one or more security sensors with embedded GPS receivers can be implemented in a remote sensing scheme by dropping the sensors in an area to be secured. The GPS receivers locate the position of the sensors, and provide location and field of view data back to a central command and control facility.

In another approach, a security system employing the present security sensors can be programmed to identify friend or foe (IFF). For example, targets that are supposed to be within a secured area, such as security personnel, can display a reflective pattern or device providing a return signal that is decoded to determine friend or foe status. Targets that are "friendly" can be displayed on a 3-D map based on the reflected return signals. Assuming only authorized personnel are given the IFF capability, they could move freely around the secured area without causing an alarm.

Additional details of the present security sensor and its implementation in a security system are described in the following sections.

MEMS LADAR Devices

Figures 2A, 2B:
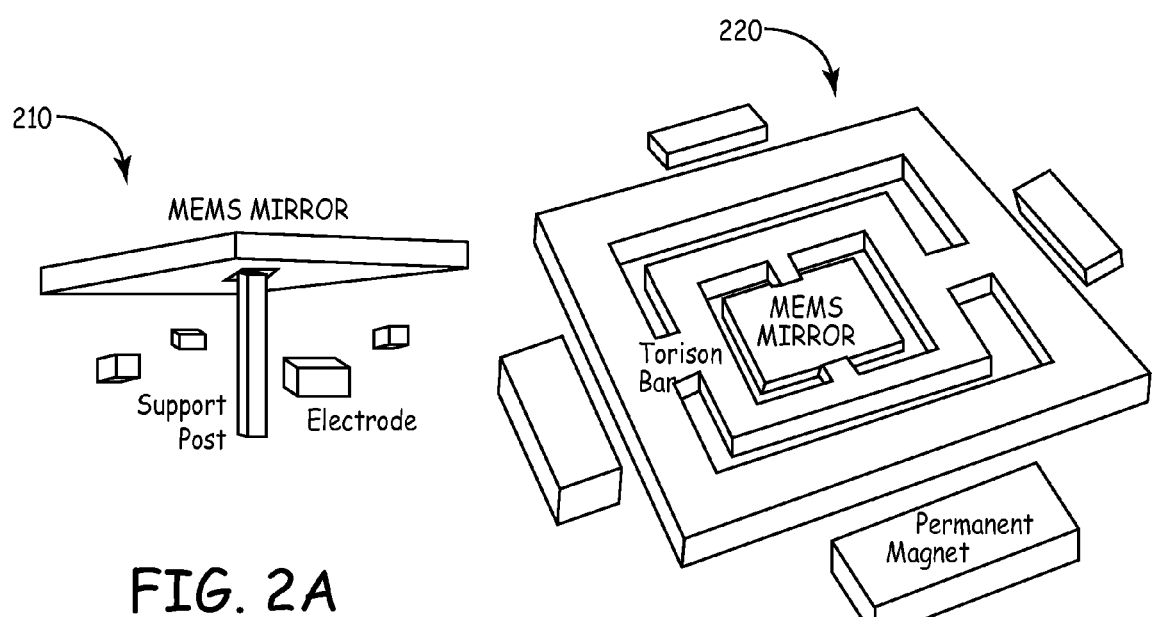
FIGS. 2A and 2B show two alternative MEMS designs for a mirror support mechanism of a proposed prior MEMS-based LADAR device.

FIGS. 2A and 2B show two alternative MEMS designs for a mirror support mechanism of a MEMS-based LADAR device that can be used in the present security sensor. FIG. 2A shows an electrostatic support post MEMS mirror 210, and FIG. 2B depicts an electromagnetic torsion bar MEMS mirror 220. Further details related to these MEMS mirrors is found in J. P. Siepmann, *Fusion of current technologies with real-time 3D MEMS ladar for novel security & defense applications*, Proceedings of SPIE: Vol. 6214 (2006), the disclosure of which is incorporated herein by reference.

During operation of a MEMS LADAR device, laser pulses are reflected from a moving MEMS mirror to direct the pulses in varying directions. In these devices, the mirror motion is oscillatory in two dimensions at the natural frequencies of the mechanical structures. Typical frequencies are in the range of about 0.5-1.5 kHz. An important characteristic of a MEMS-based LADAR device is that the laser pulses are not "steered" to specific locations. Instead, a steady laser beam reflected from the MEMS mounted mirror traces a "Lissajous figure" across a scanned area or "window." If the oscillatory frequencies in the two dimensions are relatively prime, a constant beam eventually traces over the entire window. This typically takes a large number of oscillation cycles. Laser energy must be sent in pulses rather than a constant beam in order to determine the range to reflecting objects. As a result, the transmitting duty cycle of the laser is very low and will take a much longer time to "paint" the entire window area with sufficient density of pulses to allow creation of complete images from their reflections. However, in order to detect an intruder, it is not necessary to generate a complete image. All that is necessary is to recognize with sufficient accuracy and reliability the reflection of energy or absence of reflected energy caused by the intruder.

Another important characteristic of the MEMS LADAR device is that the transmission direction of each laser pulse is not deterministically controlled by the sensor. Instead, the sensor reads the tilt angle for each axis and then "samples" this value at the time of transmission of a pulse. The information provided to the security system by the MEMS LADAR device includes the azimuth and elevation of the pulse transmission direction, and the reflected signal strength versus time relative to the time of pulse transmission as observed by a laser energy detector (described hereafter).

LADAR devices based on MEMS technology have very limited maximum tilt angles (equivalent to azimuth and elevation) for the mirror used to direct the laser pulses across the monitored area. Although this can be increased through the use of additional mirrors and/or optics, the maximum swept area is too small for monitoring a large facility with a single LADAR device. However, the very low cost of MEMS-based LADAR devices makes it practical to use a combination of many LADAR devices to achieve the required scanning coverage.

LADAR Data Processing

Figure 3:
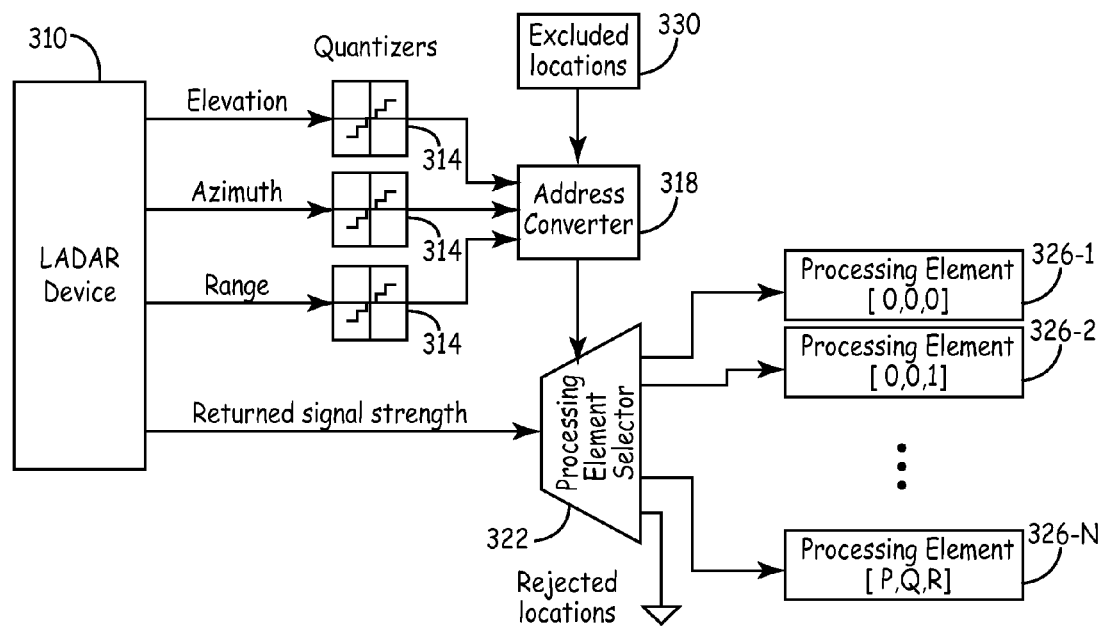
FIG. 3 illustrates a system for processing information data obtained by a LADAR device in a security sensor according to one embodiment of the invention.

FIG. 3 illustrates one approach for processing raw information data produced by a single LADAR device 310 in a security sensor according to one embodiment. This approach can be implemented by software instructions that are executed by a processor.

It is assumed that LADAR device 310 provides as outputs the azimuth angle and elevation angle of the pulse transmission, the range of a target that could be currently returning energy (based on the time delay since the pulse was transmitted) and the signal strength of the returned energy. These outputs can be digital or analog values or some mixture at this point. Since the tilt angles of the pulse mirror are constantly changing as discussed above, it is assumed that the azimuth and elevation angle values provided by the LADAR device are latched (i.e., sampled and frozen) at the time the pulse is transmitted, with these values being retained until the next pulse is transmitted. Since the range value is equivalent to the time that has elapsed since pulse transmission scaled by the speed of light, this value increases linearly with time. The returned signal strength value also varies with time as energy reflected by various objects reaches the detector. Processing of the returned energy values is done by a set of processing elements whose operation is explained hereafter.

During data processing, the elevation, azimuth, and range values from the LADAR device 310 are first each quantized into a limited set of discrete values by a set of quantizers 314. These values can be represented in digital format after quantization. The quantization step sizes do not have to be uniform and the number of levels does not have to be the same for each coordinate value. Each set of three quantized coordinates now represents the center of a volume of space whose size depends on the location and on the size of the steps used to produce the related quantized values.

An address converter 318 converts the three quantized coordinate values into a single unique address value, which is provided to a processing element selector 322. The processing element selector 322 directs the current value(s) of the returned signal strength to a single processing element 326-1, 326-2, . . . 326-N based on this address. The selected processing element is thereby associated with the volume of space represented by the quantized coordinates. The selected processing element receives the returned signal strength values for the energy reflected by any targets that are currently occupying some portion of this volume as observed by the transmitting LADAR device's detector.

In a practical installation, there will generally be some objects that, while outside of the protected area, nevertheless reflect some of the energy transmitted by the LADAR device. To avoid wasting processing time and other resources, these locations can be excluded by determining the quantized values representing the volumes they occupy and providing these to address converter 318 as excluded locations 330. When address converter 318 receives a set of quantized coordinates that match one of the excluded locations 330, it does not direct the returned signal strength values to any processing element, effectively ignoring this information as a rejected location.

Figure 4:
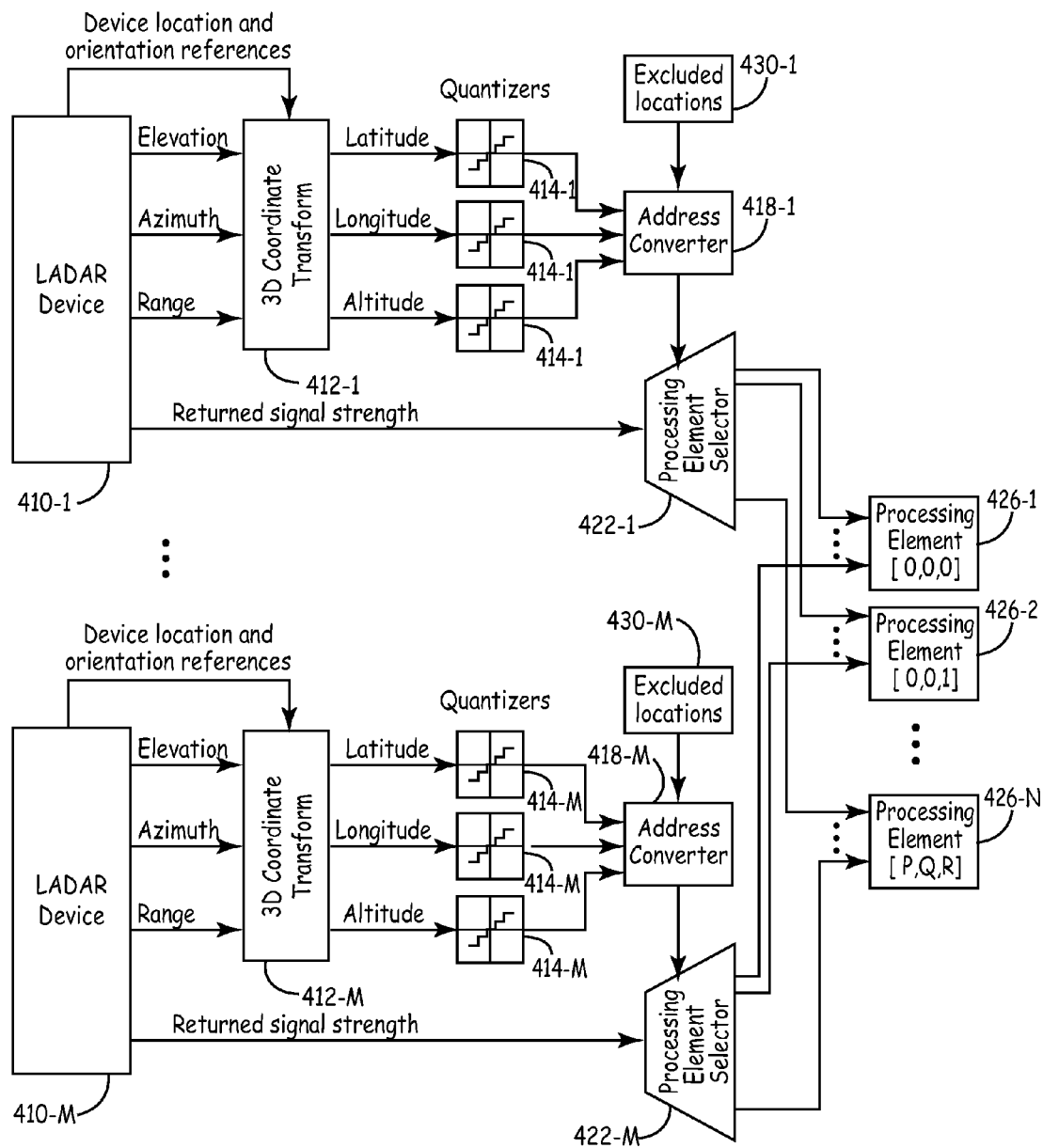
FIG. 4 illustrates a system for processing and combining information obtained by multiple LADAR devices according to another embodiment of the invention.

FIG. 4 illustrates an approach for processing and combining information produced by multiple LADAR devices 410-1, . . . 410-M in a security system according to another embodiment. Such an approach is appropriate for an installation in which there are large areas within the scanning zones of multiple LADAR devices. In order to combine the detection information, it is first necessary to convert the elevation, azimuth and range values from each LADAR device into a common coordinate system. This is done by 3-D coordinate transform components 412-1, 412-M that are in operative communication with respective LADAR devices 410-1, 410-M. In addition to the LADAR-relative coordinates, the 3-D coordinate transform components receive the location and reference orientation for their associated LADAR device expressed in a common earth-based coordinate system. The 3-D coordinate transform components then perform the necessary geometric calculations to continuously convert the LADAR coordinates into earth-based common coordinates. For example, a common earth-based coordinate system such as the Geodetic system of latitude, longitude, and altitude can be used. Alternatively, other suitable coordinate systems can be used, such as East North Up (ENU), or Earth Centered Earth Fixed (ECEF).

A set of quantizers 414-1, . . . 414-M operate on the converted coordinates from respective 3-D coordinate transform components 412-1, . . . 412-M. As in the approach of FIG. 3, the step sizes and number of levels do not have to be the same from one axis to the other (e.g., latitude vs. longitude). However, these values must be the same for a given axis (e.g., latitude) across all LADAR devices in order for the volumes represented by each set of quantized, converted coordinates to represent the same location and volume in space.

An Address converter 418-1, . . . 418-M for each LADAR device converts the coordinate values into a single unique address value which is then provided to a respective processing element selector 422-1, . . . 422-M. The processing element selector for each LADAR device directs the current value(s) of the returned signal strength to a single processing element 426-1, 426-2, . . . 426-N based on this address. The selected processing element is thereby associated with the volume of space represented by the quantized coordinates.

Excluded locations 430-1, . . . 430-M input into the address converters are typically the same for each LADAR device, but this is not required. The result is that, in general, each processing element can potentially receive the returned signal strength values from each LADAR device for energy reflected by a target in the associated volume. Of course, the total swept volume will be different for each LADAR device and not all devices will have portions of this volume in common. This simply means that the complete set of quantized coordinate values generated for each LADAR device will be different. As a result, some processing elements will receive as inputs the returned signal strength values for only one LADAR device. Depending on the location and orientation of the devices, other processing elements will receive returned signal strength values for two or more LADAR devices.

Figure 5:
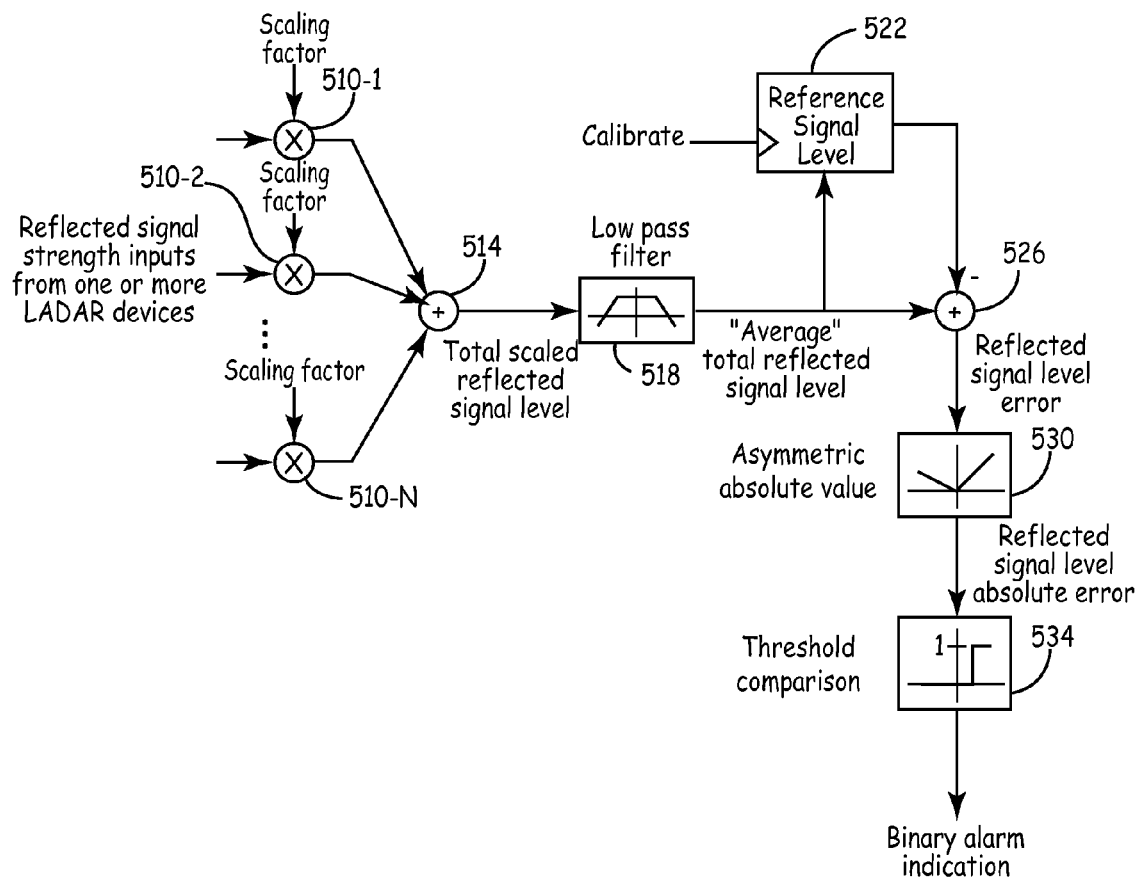
FIG. 5 illustrates a data processing method performed by a processing element for a LADAR security sensor according to one embodiment of the invention.

FIG. 5 illustrates the operations performed by a single processing element. As described above, the inputs to a processing element are signal strength values for one or more LADAR devices for the energy reflected from a target within the volume of space defined by the set of quantized coordinates associated with the processing element via the system approaches of FIGS. 3 and 4. Each of these reflected signal strength inputs is scaled appropriately using a scaling factor 510-1, 510-2, ... 510-N to compensate for differences such as distance from the LADAR device to the target volume, the sensitivity of the detector in the particular relative direction of the target volume, and the like. The scaled inputs are then combined at a summer 514 to produce a total scaled input reflected signal level, which is processed in a low pass filter 518 to obtain an average total reflected signal level for the volume over time. The pass band of low pass filter 518 is selected to reject the variations from pulse to pulse while passing the variations in average return that would occur for an expected target moving through the associated volume.

The basic detection scheme is to compare the current average total reflected signal level against a saved reference signal level 522 to obtain a reflected signal level error. The reference signal level is obtained by performing a calibration process. This calibration process includes running the sensor system when it is known that there are no targets (e.g., intruders, authorized personnel, or vehicles) within the monitored area. For a processing element associated with a volume that is unoccupied under normal (secure) conditions, the reference signal level will be very low. On the other hand, for a processing element associated with a volume that is occupied by some fixed object, such as a fence, utility pole, building, storage tank, etc., the reference signal level will be very strong. After running the sensor system long enough for the values to stabilize, the values are saved as the reference signal levels. It may be necessary to run this calibration process to obtain reference signal level values for a variety of visibility conditions. If this is done, it would be necessary to automatically detect the current visibility and select the saved reference values for use by the processing elements.

After a reflected signal level error is generated by subtracting the reference signal level from the current average total reflected signal level at 526, the absolute value of the reflected signal level error is obtained at 530. This can be done in an "asymmetric" manner so that different weighting is given to the "image" (positive) error versus the "shadow" (negative) error. The reflected signal absolute value is then compared to a threshold value at 534 and, if the threshold value is exceeded, an alarm signal is activated. This can be a binary alarm signal set to the active state and reported to monitoring facilities as needed for the appropriate notifications, evaluations, etc.

Intruder Detection

When an intruder (or any object not present when the calibration is done) enters a monitored area, some processing elements detect one of two conditions. For the processing elements associated with the volume occupied by the intruder, the average total reflected signal level (output of the low-pass filter) will be greater than the reference signal level so that the difference value resulting from subtracting the reference level will be a positive value.

Assuming that the intruder is opaque to the wavelength of the laser in a LADAR device, the presence of the intruder also casts a "shadow" on all volumes for which the intruder is between the location of the volume and the LADAR device. For any of these volumes that contain some permanent object, the associated processing element will observe that the current reflected signal strength is much less than the reference value.

The ability to detect the "shadow" of an intruder as well as the intruder's direct "image" provides a significant benefit. A well-prepared intruder who knows that the area is monitored by LADAR and knows the location and scan zone for each device, may seek to prevent detection by carrying a large mirror or set of mirrors and orienting the mirrors so that the energy from any LADAR device is always reflected out of the LADAR's detection area. If a security system is only looking for the intruder's "image," such an intruder could possibly be "invisible" to the system. In the present sensor system, however, the intruder will not be able to prevent detection of its laser "shadow."

A beneficial way to further exploit the shadow detection capability of the present sensor system is to intentionally install highly reflective objects at numerous locations around the periphery of a monitored area. One arrangement includes reflective panels mounted at a right angle to each other so that light energy impinging on the object from a wide range of angles is reflected at an angle exactly opposite of the entry angle. This will return a very strong signal to one or more LADAR devices resulting in a large value for the reference signal level. When there is an intruder between a LADAR device and one of these reflectors, the reflected signal level in the processing elements whose volumes include the reflectors will be much weaker than the calibrated reference value. Even if the intruder is directly in front of the reflector so that both the intruder and the reflector are within the volumes of the same set of processing elements, there may be enough of a decrease in reflected energy to allow reliable detection.

Use of an intruder's "shadow" for detection may be especially beneficial in conditions of poor laser "visibility." In this case, the energy reflected by an intruder may be weakened to the point that it does not exceed the detection threshold. However, due to the very strong signal returned by the fixed reflectors described above, even in conditions of poor visibility, there may still be sufficient contrast when an intruder's shadow is cast on the reflector to allow reliable detection.

Surveillance Configuration

Figure 6A:
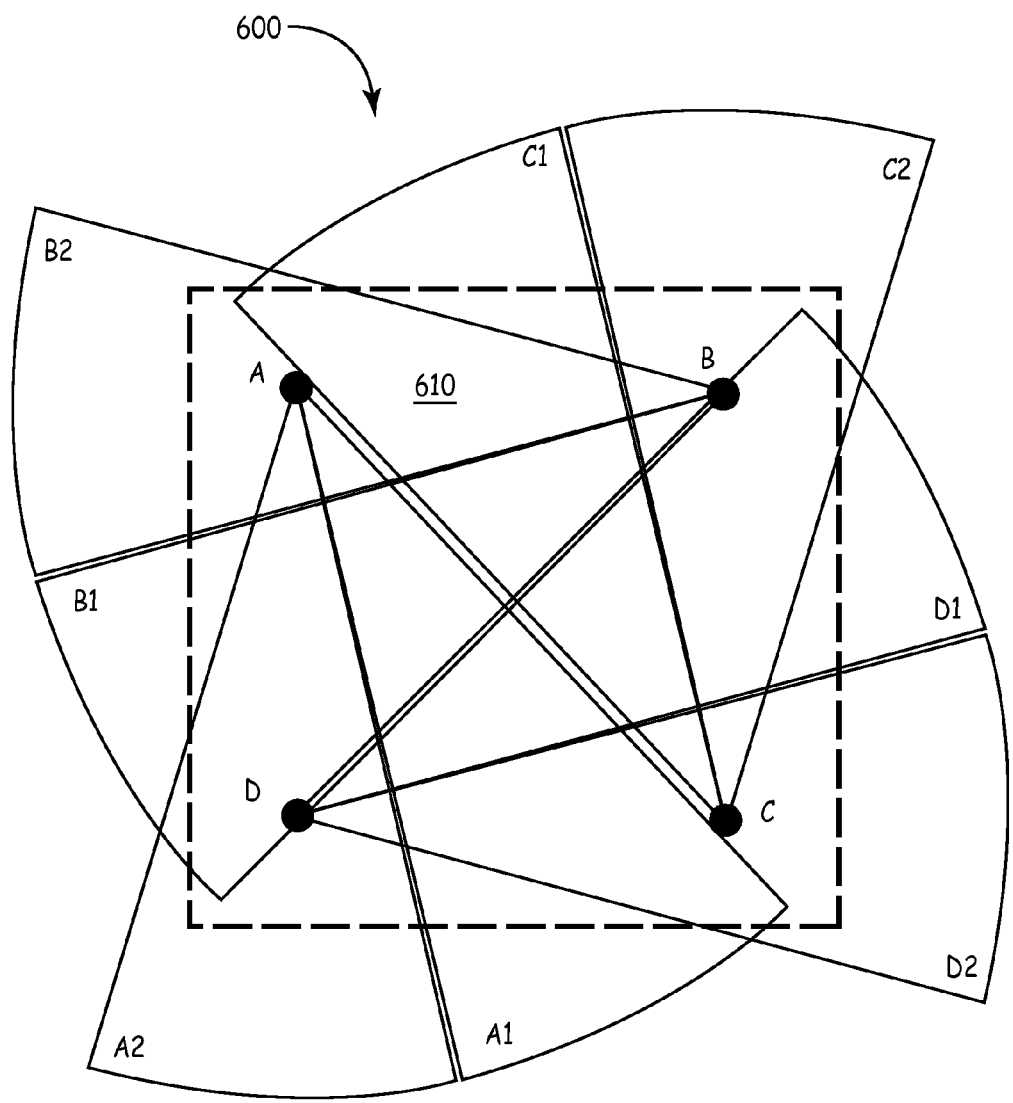
FIGS. 6A-6C show exemplary surveillance arrangements of multiple LADAR scanning zones used to monitor a secured area.

FIG. 6A shows one exemplary surveillance arrangement 600 of LADAR scanning zones used to monitor a secured area 610 (delimited by the dashed line). In this case, a pair of LADAR sensors (A1/A2, B1/B2, C1/C2, D1/D2), each with an azimuth scanning range of about 30°, is mounted on each of four poles (labeled A, B, C and D) to achieve full coverage of secured area 610. Many sections of secured area 610 are overlappingly swept by the pair of LADAR sensors on each pole, with the laser beams being roughly perpendicular in such mutual sections.

The arrangement 600 is advantageous in that no LADAR sensor will "blind" another device's detector by sending its pulses directly into the detector of the other. However, in order to prevent false targets caused by one detector picking up a reflection of another LADAR sensor's pulse, it is necessary to synchronize pulse transmissions among some sensors so that only one sensor transmits a pulse at a time, and the time between pulses is sufficient for detection of a return signal from any reflecting object, not only within the monitored area but within the maximum detection range of the LADAR sensors. If detectors in the LADAR sensors are reasonably directional, it is possible for multiple sensors to transmit at the same time. For example, the following pairs of sensors shown in FIG. 6A can potentially transmit at the same time: C2 and A2, B2 and D2.

If the LADAR sensors are mounted fairly close to the ground, a wide sweep angle in the elevation dimension is not needed. This may restrict the ability of a sensor to detect targets that are very close. However, in the arrangement in FIG. 6A, a target close to any pair of LADAR sensors will be in the ideal detection area of another LADAR sensor. For example, a target close to pole A is in the ideal detection area for LADAR sensor B2.

In another embodiment, the LADAR sensors can be configured to scan outside of the perimeter of secured area 610 to find potential intruders outside the perimeter. A LADAR sensor can also be deployed in a central portion of secured area 610 and configured to scan outward for complete coverage.

Scattered Energy Detection

Figure 6B:
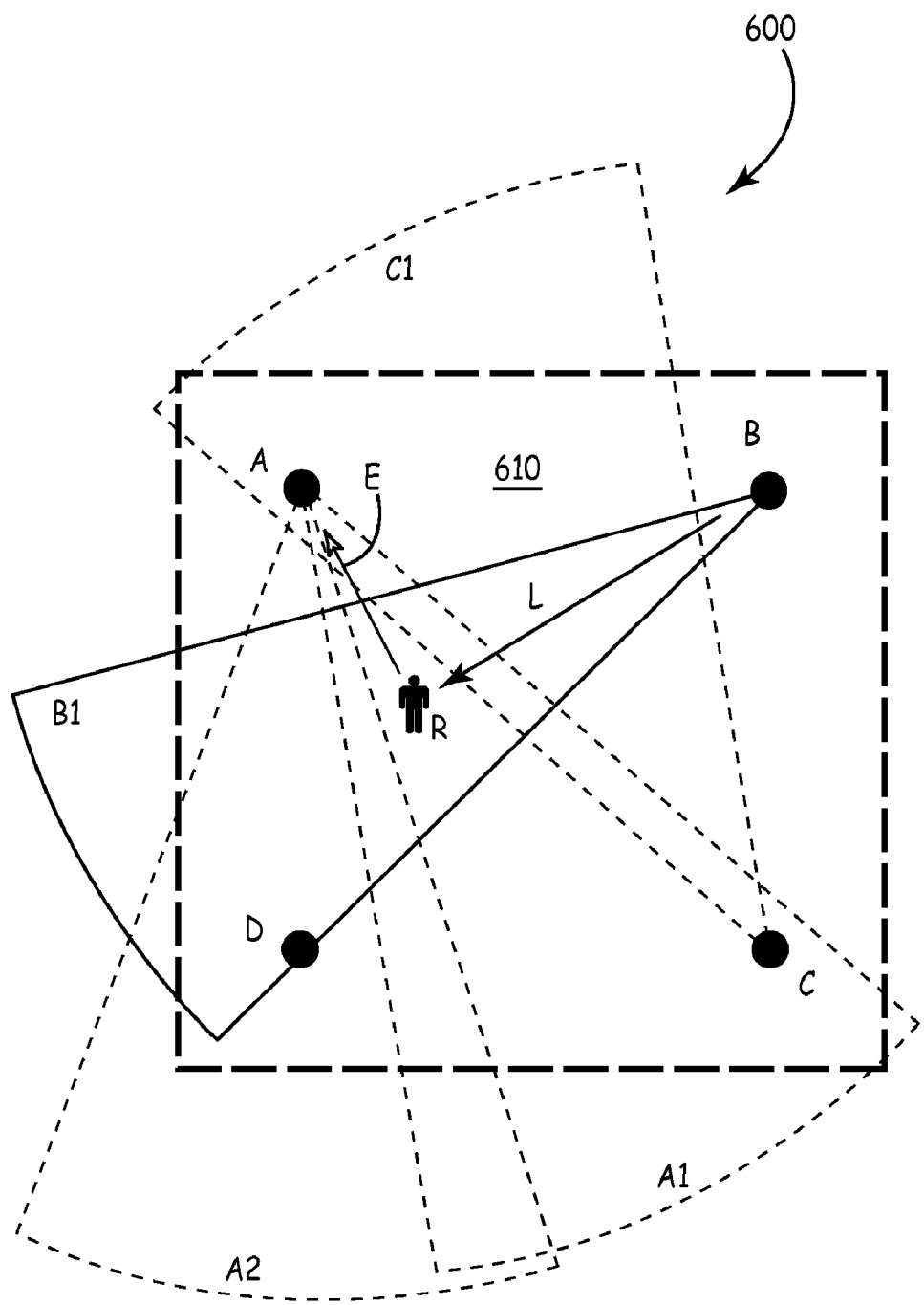

When laser energy strikes a complex object it is not only reflected back toward the source, as some of the energy is scattered in other directions. This means that in the arrangement of LADAR sensors shown in FIG. 6A, for example, the energy that is transmitted by one LADAR sensor and scattered from an object may be detected by other LADAR sensors. This is illustrated in FIG. 6B, which shows the same surveillance arrangement 600 as FIG. 6A for secured area 610, but with only the transmission zone of LADAR sensor B1 and representative detection zones (outlined by dashed lines) of LADAR sensors C1, A1 and A2. The arrow L represents a pulse of laser energy that is transmitted from LADAR sensor B1 and then deflected from the object (intruder) R such that some of scattered energy E is detected by LADAR sensor A1. Assuming only one LADAR sensor transmits at a time, as discussed previously, the detection by a LADAR sensor of scattered energy (meaning energy from a pulse that it did not transmit) can be used to enhance the intrusion detection process.

Figure 6C:
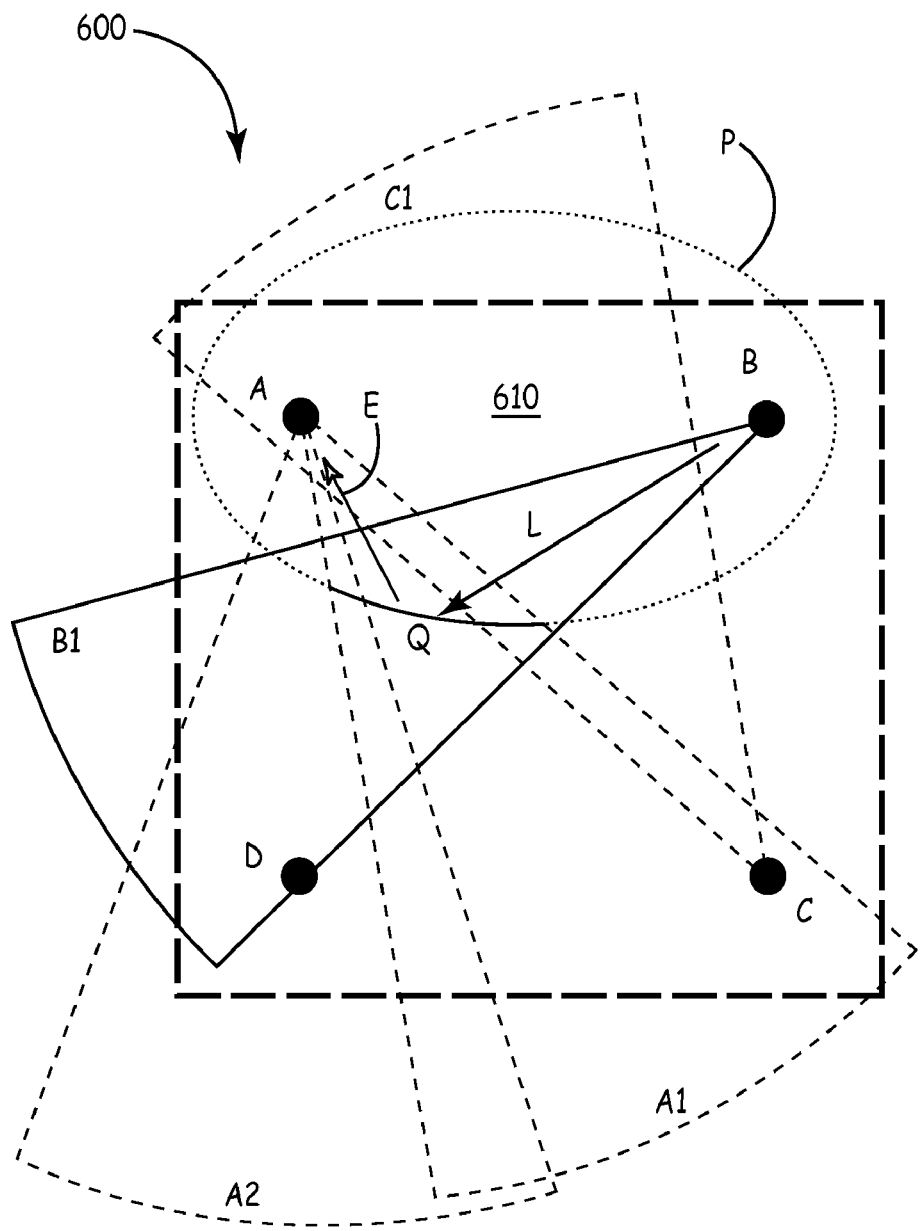

The laser energy detectors used in the LADAR sensors do not have the ability to determine the direction from which energy is received other than that the energy is from somewhere within the detector's "visibility" window. This area is at least as wide as the zone of transmission angles. When a LADAR sensor detects scattered energy, the information available is the time delay between the time of transmission of the pulse and the time of detection. This means that the object that deflected the pulse can be at any point in the detector's visibility window for which the sum of the distance from the transmitting LADAR sensor to the object and the distance from the object to the detecting LADAR sensor is equal to the product of the time delay and the speed of light. The set of points that meets this restriction is the surface of an ellipsoid (more precisely, a "prolate spheroid") for which the location of the transmitting and detecting LADAR sensors are the foci. This surface is represented in two dimensions by the dotted line P in FIG. 6C, which shows the same surveillance arrangement 600 as FIG. 6B for secured area 610. The area of interest is the portion of the ellipsoid surface that is also within the transmission window for the transmitting LADAR sensor and the detection window of the receiving LADAR sensor. This is represented in two dimensions by the solid line labeled Q in FIG. 6C on the ellipsoid surface. The object deflecting laser energy L transmitted by LADAR sensor B1, which is detected by LADAR sensor A1 as scattered energy E, can be located anywhere on line Q of the ellipsoid surface.

Figure 7:
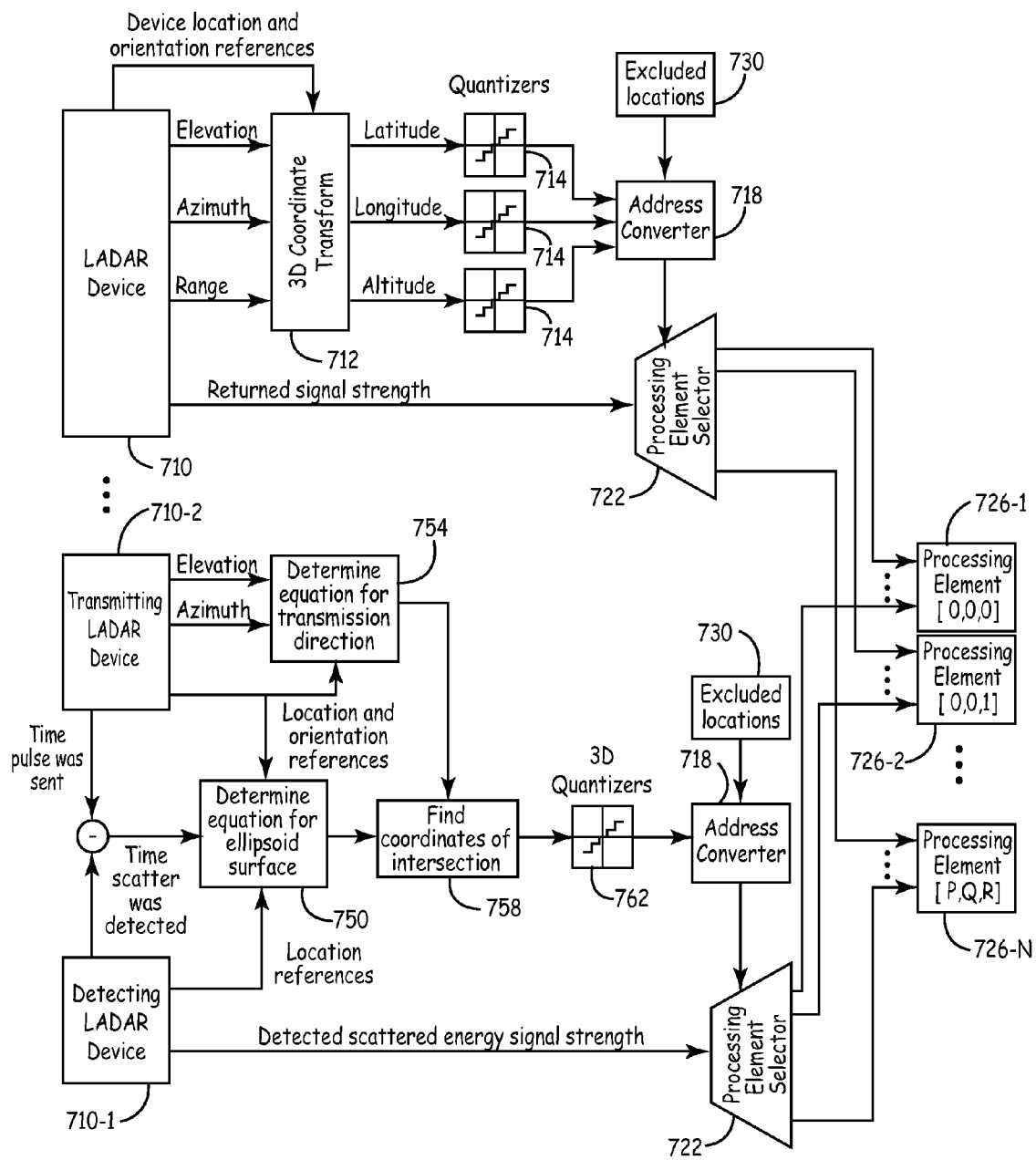
FIG. 7 illustrates a system for processing and combining information obtained by one or more LADAR devices in a security system according to another embodiment of the invention.

FIG. 7 illustrates an approach for processing and combining information obtained by one or more LADAR sensors in a security system according to another embodiment, which is enhanced to incorporate the detection of scattered energy into the intrusion detection process. The upper portion of FIG. 7 is similar to the approach shown in FIG. 4. The elevation, azimuth, and range values from each LADAR device 710 are converted into a common coordinate system using a 3-D coordinate transform component 712 in operative communication with each LADAR device 710. The 3-D coordinate transform component 712 also receives the location and reference orientation for its associated LADAR device expressed in a common coordinate system. The 3-D coordinate transform component 712 then performs the necessary geometric calculations to continuously convert the LADAR coordinates into the common coordinates.

A set of quantizers 714 for each LADAR device operate on the converted coordinates from a respective 3-D coordinate transform component 712. An address converter 718 for each LADAR device converts the coordinate values into a single unique address value which is then provided to a respective processing element selector 722. The processing element selector 722 for each LADAR device directs the current value (s) of the returned signal strength to a single processing element 726-1, 726-2, . . . 726-N based on this address. The selected processing element is thereby associated with the volume of space represented by the quantized coordinates.

Excluded locations 730 input into the address converter 718 are typically the same for each LADAR device, but this is not required. The result is that, in general, each processing element can potentially receive the returned signal strength values from each LADAR device for energy reflected by a target in the associated volume.

The lower portion of FIG. 7 shows the approach for detecting scattered energy during the intrusion detection process. It is assumed that the time at which a pulse is transmitted by any LADAR device can be known by any other LADAR device or detector in the system. This information can be easily provided via communication links between the devices. When a LADAR device 710-1 detects laser energy that is not from its own transmission, the first step is to determine the total time of travel of the pulse from a transmitting LADAR device 710-2 to the deflecting object and then to the detector. The transmission distance implied by this time delay and the locations of the transmitting and receiving LADAR devices are then used to determine the equation for the ellipsoid surface on which the deflecting object is located (block 750). The elevation and azimuth angles when the pulse was transmitted and the location and orientation of the transmitting device are used to determine the equation for a line in three-dimensional space representing the transmission direction of the laser (block 754).

The next step is to find the intersection of this line and the ellipsoid surface by simply finding the solution to the combined equations (block 758). (Actually there will be two solutions but only one will agree with the direction of transmission of the pulse.) The three dimensional coordinates of this intersection are then quantized using 3-D quantizers 762 and converted to an address by an address converter 718.

The address value is then provided to a processing element selector 722 that is used to select the appropriate processing element. This will be the processing element whose associated volume encloses the intersection point. The result of this selection is that the detected scattered energy signal strength information is included as an input to the processing element.

The approach for detecting scattered energy during the intrusion detection process as shown in FIG. 7 can be provided for any number of transmitting and detecting LADAR combinations. There is no restriction on the number of detecting devices that can be combined with a single transmitting device other than the visibility window of a detecting device would logically have some area in common with the transmitting window of the transmitting device.

Figure 8:
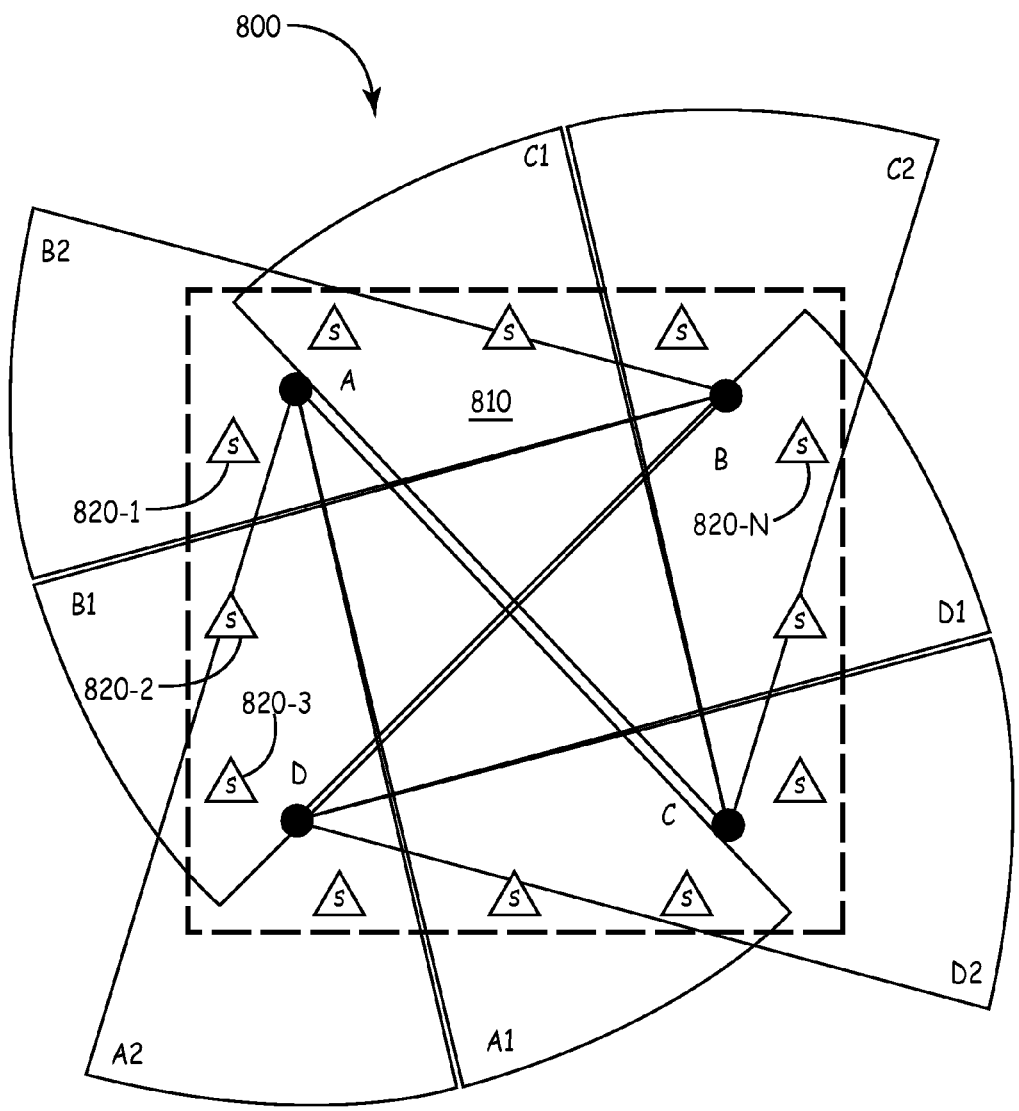
FIG. 8 shows an exemplary surveillance arrangement of multiple LADAR scanning zones used to monitor a secured area that includes a plurality of detector devices.

Since a laser energy detector alone is less expensive than a complete MEMS-based LADAR sensor, the cost-effectiveness of a security system can be improved by deploying detector-only devices at appropriate locations within the monitored area and then incorporating the detection of scattered LASER energy by these detector-only devices. Due to the lower cost of the detector-only devices, it is practical to deploy a much larger number of detectors relative to the number of LADAR transmitters. FIG. 8 shows one exemplary surveillance arrangement 800 of LADAR scanning zones used to monitor a secured area 810, which is similar to the surveillance arrangement 600 shown in FIG. 6A, but includes a plurality of added detector-only devices 820-1, . . . 820-N surrounding the perimeter of area 810. The arrangement shown in the lower part of FIG. 7 is required for each combination of a LADAR transmitter and a detector-only device. This arrangement would logically be provided for only those combinations that achieve the best detection of light energy scattered by an intruder. Although not required, it may be that the best coverage is obtained by orienting the detection windows of all detectors 820-1, . . . 820-N in FIG. 8 toward the center of the protected area 810. In this case, for example, the detectors 820-1, 820-2, and 820-3 would be expected to readily detect scattered light transmitted by LADAR devices A1, A2, C1, and C2. However, detectors 820-1, 820-2, and 820-3 would not be paired with devices B1 and B2 since these detectors would likely be "blinded" by the directly impinging transmitted energy of devices B1 and B2.

Sensor Fusion

Figure 9:
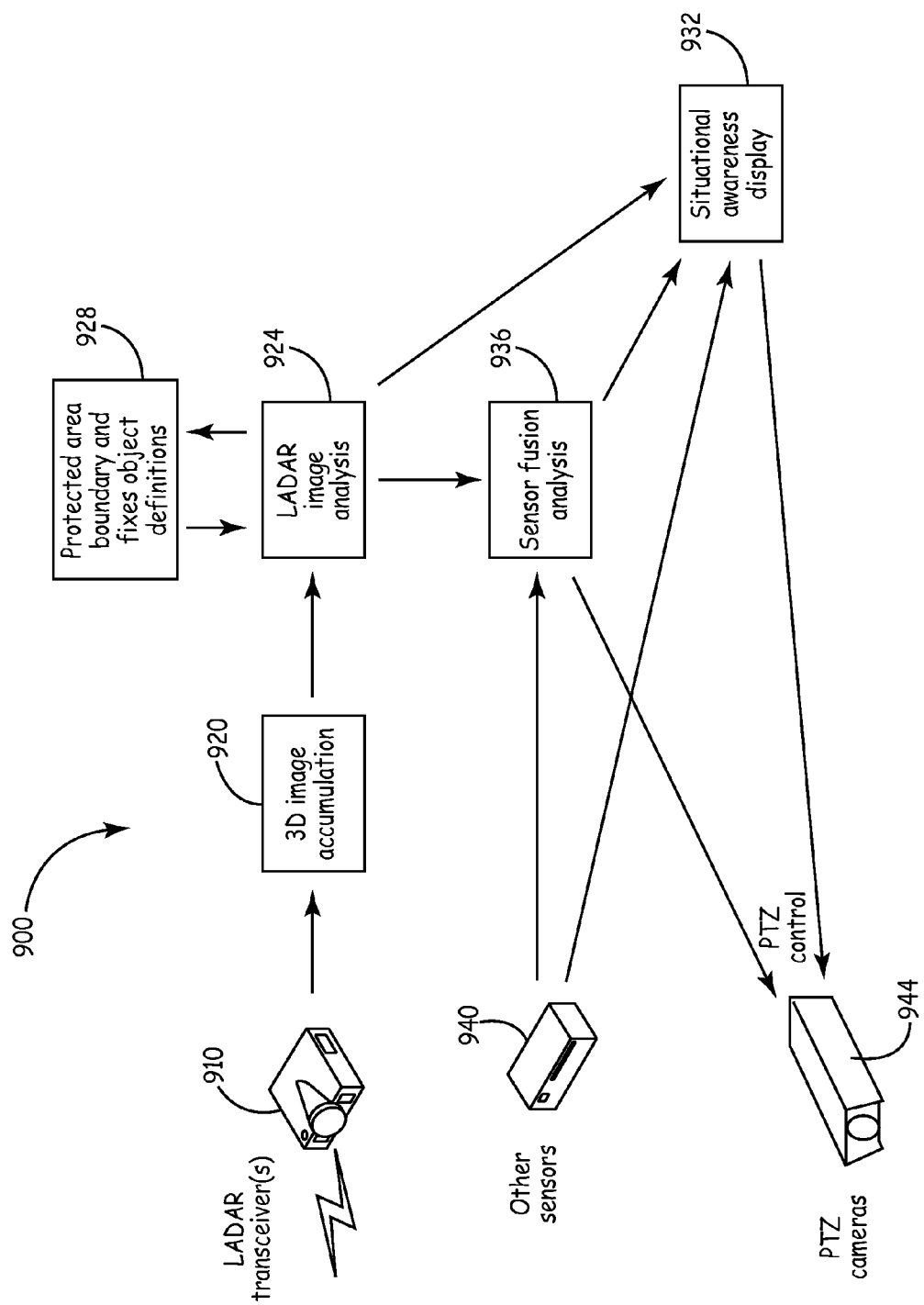
FIG. 9 illustrates a sensor fusion approach that can be incorporated into a perimeter security system having various types of sensors.

The LADAR security sensors described herein can be incorporated with other conventional security sensors using a "sensor fusion" approach. FIG. 9 illustrates a sensor fusion system 900 that can be incorporated into a security system having various types of sensors. One or more LADAR transceivers 910 transmit and receive signals that are used for 3-D image accumulation (block 920). A LADAR image analysis module 924 compares the 3-D images with protected area boundary and fixed object definitions (block 928). The results from the LADAR image analysis are sent to a situational awareness display 932 and to a sensor fusion analysis module 936.

One or more non-LADAR sensors 940 are deployed along with the LADAR transceivers 910. The non-LADAR sensors can be conventional sensor devices, such as passive infrared detectors, microwave beam and proximity detectors, seismic or acoustic sensors, the output of a video analytics object motion detection process, and the like. Data from these sensors is sent to sensor fusion analysis module 936 and is also transmitted to situational awareness display 932. The results from the sensor fusion analysis are also sent to situational awareness display 932. The resulting data can be used to provide a control signal to one or more video cameras 944, such as pan-tilt-control (PTZ) cameras. The control signal can be transmitted from sensor fusion analysis module 936 or situational awareness display 932.

Figure 10:
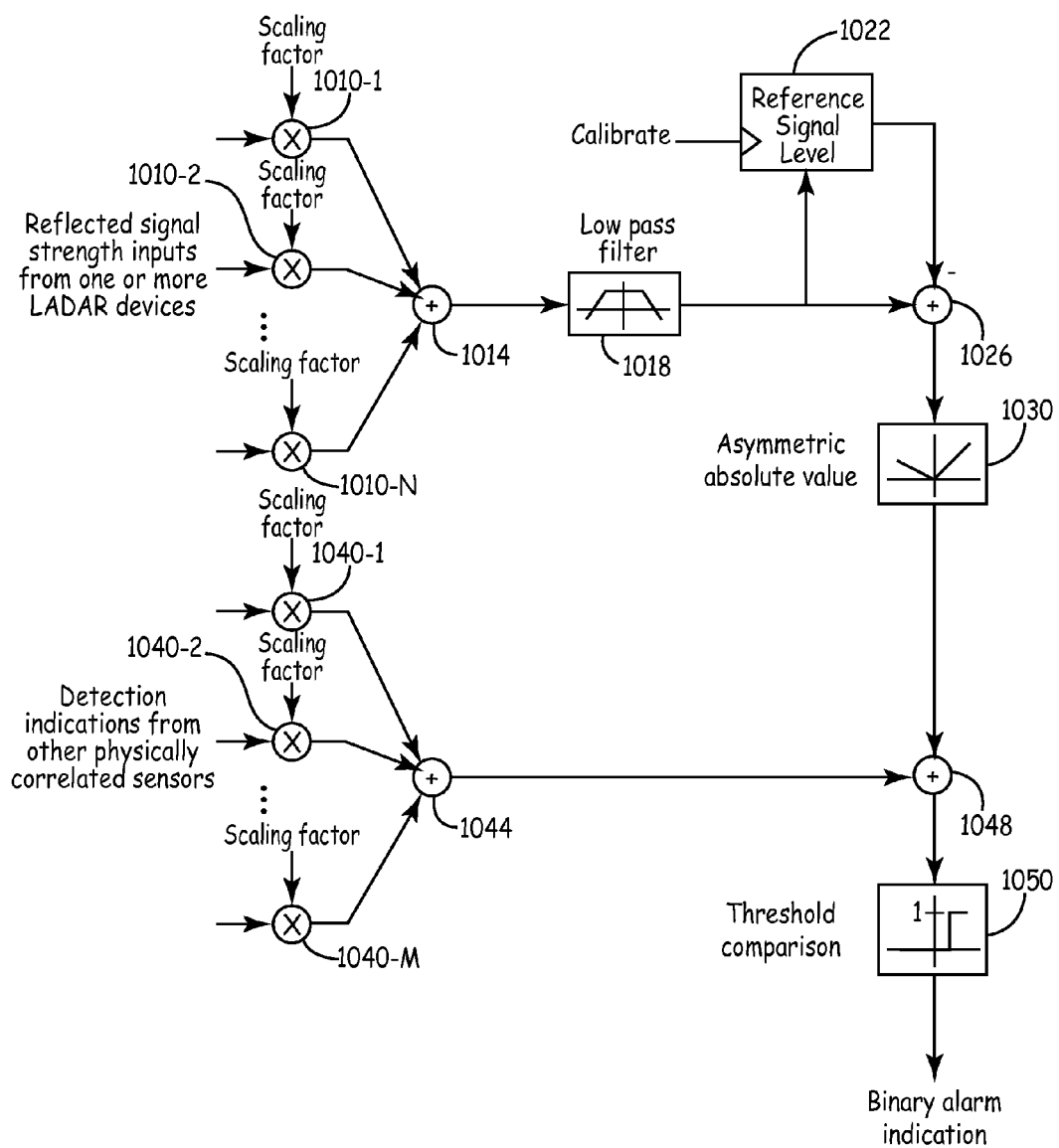
FIG. 10 illustrates a data processing method performed by a processing element for a sensor fusion approach of the invention.

FIG. 10 illustrates one implementation for processing and combining information produced by the sensor fusion approach, in which operations performed by a processing element for LADAR detection are also applied to considering the current state of other security sensors as well. The upper portion of FIG. 10 is similar to the approach shown in FIG. 5.

As described previously, the inputs to a processing element are signal strength values for one or more LADAR devices for the energy reflected from a target within the volume of space defined by the set of quantized coordinates associated with this processing element. As depicted in FIG. 10, each of the reflected signal strength inputs is scaled appropriately using a scaling factor a scaling factor 1010-1, 1010-2, . . . 1010-N. The scaled inputs are then combined at a summer 1014 to produce a total scaled input reflected signal level, which is processed in a low pass filter 1018 to obtain an average total reflected signal level for the volume over time, which is compared against a saved reference signal level 1022 that is obtained by performing a calibration process as described hereinbefore.

After a reflected signal level error is generated by subtracting the reference signal level from the current average total reflected signal level at 1026, the absolute value of the reflected signal level error is obtained at 1030. This can be done in an "asymmetric" manner so that different weighting is given to the "image" (positive) error versus the "shadow" (negative) error.

The lower portion of FIG. 10 shows how the current state of other non-LADAR security sensors is analyzed in the present sensor fusion approach. For a given processing element, the sensor fusion approach considers the state of non-LADAR sensors whose detection area includes the volume associated with this processing element. For example, video analytics information can be used by first converting the two-dimensional object location within the camera image into a three-dimensional location and volume based on the camera position and orientation as well as the size of the moving image, and then assigning the detection status to the appropriate processing element(s).

As shown in FIG. 10, detection indications from other physically correlated non-LADAR sensors can be scaled appropriately using a scaling factor 1040-1, 1040-2, . . . 1040-M and then summed at 1044 to produce a total scaled signal level, which is combined with the reflected signal level error from the LADAR device at 1048. The resulting combined sensor signal is then compared with a threshold value at 1050 to determine if an alarm condition exists. If the threshold value is exceeded, an alarm signal is activated. This can be a binary alarm signal set to the active state and reported to monitoring facilities as needed.

A benefit of employing the present LADAR sensors in a security system using the sensor fusion approach is that the precision of the LADAR location information facilitates determining exactly which other sensor devices should be included in the evaluation done by any given processing element. Since the LADAR devices scan the complete volume of the protected area, there is overlap with the detection area of each of the other non-LADAR sensors. This overlap allows for a simple fusion process that only needs to look at the current detection states, as opposed to considering a time history of detection states as is needed when there is minimal overlap of sensor detection areas.

Instructions for carrying out the various process tasks, calculations, and generation of signals and other data used in the operation of the systems and methods of the invention can be implemented in software, firmware, or other computer readable instructions. These instructions are typically stored on any appropriate computer readable media used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code in the form of computer executable instructions or data structures. Any of the foregoing may be supplemented by, or incorporated in, specially-designed application-specific integrated circuits (ASICs) or field programmable gate arrays (FPGAs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The methods of the invention can be implemented by computer executable instructions, such as program modules, which are executed by a processor. Generally, program modules include routines, programs, objects, data components, data structures, algorithms, and the like, which perform particular tasks or implement particular abstract data types. Computer executable instructions, associated data structures, and program modules represent examples of program code means for executing steps of the methods disclosed herein. The particular sequence of such executable instructions or associated data structures represents examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A security sensor, comprising:
    at least one laser detection and ranging (LADAR) device configured for accumulation of three-dimensional image data by transmitting a plurality of laser pulses;
    a data processor in operative communication with the LADAR device and comprising:
        a plurality of quantizers configured to each respectively receive elevation values, azimuth values, or range values, based on a laser pulse transmission direction, and generate discrete coordinate values for the LADAR device;
        an address converter configured to convert the discrete coordinate values from the quantizers into single address values;
        a processing element selector configured to receive the single address values from the address converter, and to receive returned signal strength values from the LADAR device; and
        a plurality of processing elements each corresponding to a discrete address value and in operative communication with the processing element selector;
    wherein the processing element selector is configured to direct a returned signal strength value to a selected one of the plurality of processing elements such that the selected processing element is associated with a volume of space represented by the discrete coordinate values.

2. The sensor of claim 1, wherein the LADAR device comprises a micro-electro-mechanical systems (MEMS) LADAR device.

3. The sensor of claim 1, further comprising a Global Positioning System (GPS) receiver operatively coupled to the data processor and a GPS antenna.

4. A security system, comprising:
    a plurality of security sensors positioned in a secured area, the security sensors comprising:
        a plurality of laser detection and ranging (LADAR) devices configured to scan portions of the secured area and to each generate a set of LADAR coordinates comprising an elevation value, an azimuth value, and a range value that are based on a laser pulse transmission direction;
        a three-dimensional coordinate transform component for each of the LADAR devices, configured to receive the set of LADAR coordinates from the LADAR device, and convert the LADAR coordinates into a set of earth-based coordinates;
        a plurality of quantizers configured to receive the earth-based coordinates from the three-dimensional coordinate transform component, and generate a set of quantized coordinates;
        a plurality of address converters each of which is configured to receive the quantized coordinates from the quantizers associated with one of the LADAR devices and to convert the quantized coordinates into a single address value; and
        a plurality of processing element selectors each of which is configured to receive the single address value from the address converter and a returned signal strength value from one of the LADAR devices;
    wherein the processing element selectors in each of the sensors are configured to direct a returned signal strength value from a respective LADAR device to one of a plurality of processing elements based on the single address value, such that a selected processing element is associated with a volume of space represented by the quantized coordinates of the respective LADAR device.

5. The system of claim 4, wherein the LADAR devices comprise micro-electro-mechanical systems (MEMS) LADAR devices.

6. The system of claim 4, wherein each of the processing elements is configured to receive a returned signal strength value from each LADAR device for a transmitted pulse reflected by a target in the associated volume of space.

7. The system of claim 4, wherein each of the processing elements comprises program code configured to:
    apply a scaling factor to one or more returned signal strength values to produce one or more scaled inputs;
    combine the scaled inputs to produce a total scaled input reflected signal level;
    process the scaled input reflected signal level in a low pass filter to obtain an average total reflected signal level for the volume over time;
    compare the average total reflected signal level against a reference signal level to obtain a reflected signal level error;
    obtain an absolute value of the reflected signal level error;
    compare the absolute value to a threshold value; and
    if the threshold value is exceeded, activate an alarm signal.

8. The system of claim 4, wherein the three-dimensional coordinate transform component is configured to receive a location and orientation of the LADAR device expressed in earth-based coordinates.

9. The system of claim 4, wherein the security sensors are positioned such that each LADAR device has a scanning zone that overlaps with the scanning zone of one or more of the other LADAR devices.

10. The system of claim 4, wherein the address converter is configured to receive predetermined excluded locations in the secured area.

11. The system of claim 4, wherein each LADAR device is configured to detect a scattered energy signal strength from a laser pulse transmitted by one or more other LADAR devices.

12. The system of claim 4, further comprising a plurality of discrete LADAR detectors positioned in the secured area and configured to detect scattered energy from a laser pulse transmitted by one or more LADAR devices.

* * * * *